_United States Patent Office_

3,513,101
Patented May 19, 1970

3,513,101
PREPARATION OF STABLE SOLS OF THORIA-URANIUM TRIOXIDE
Albert B. Meservey, Oak Ridge, Tenn., assignor to the United States of America as represented by the United States Atomic Energy Commission
No Drawing. Filed Apr. 25, 1968, Ser. No. 724,261
Int. Cl. G21c 19/42
U.S. Cl. 252—301.1       9 Claims

ABSTRACT OF THE DISCLOSURE

A stable thoria-uranium trioxide sol having a minimum counterion is prepared in a carbon dioxide-free atmosphere by forming a thorium (IV)-uranium (VI) seed sol which is stabilized with a stoichiometric excess of counterion and thereafter dispersing additional quantities of counterion-free thorium (IV)-uranium (VI) hydrous oxide as a water slurry in the seed sol with boiling to thereby peptize the solids into the minimum counterion sol.

BACKGROUND OF THE INVENTION

The invention described herewith was made in the course of, or under, a contract with the U.S. Atomic Energy Commission. It relates generally to hydrous metal oxide sols and more particularly to thoria-uranium trioxide sols having a minimum counterion. These sols by virtue of the minimum counterion content are uniquely useful in the preparation of high density reactor fuel microspheres by sol-gel techniques. As used herein the term "sol" is meant to refer to a colloidal suspension of oxide particles in water.

In sol-gel processes for thorium and/or uranium it is well known that the nitrate content in the sol is critical for the successful preparation of dense microspheres. Where the nitrate content is too low the sol is unstable. On the other hand, where it is too high the microspheres tend to be misshapen or to break into pieces on drying. The nitrate content necessary for the preparation of a stable sol varies depending upon the crystallite size and other factors which are poorly understood. A nitrate-to-metal mole ratio of about 0.10 is required for the preparation of pure thorium oxide sols with a crystallite size of about 70 angstroms, whereas nitrate-to-metal mole ratios of at least 0.25–0.30 are required when the crystallite size is less than 50 angstroms, as is the case with sols made from precipitated $Th(OH)_4$. When uranium is present as uranium (VI) it is possible to employ a lower nitrate-to-metal mole ratio because the uranium apparently substitutes for part of the nitrate in some way not wholly understood. In general thoria sols are of two main types—crystalline thoria sols prepared from steam denitrated oxide and hydrous amorphous thoria sols prepared by precipitation-peptization techniques. In the early thoria sol-gel work, thoria powder was prepared by passing steam (1 atmosphere) over a thin layer of thorium nitrate at an elevated temperature. The resulting thoria powder had a crystallite size of about 70 angstroms and a nitrate-to thoria mole ratio of about 0.03, and could be readily dispersed into a stable crystalline thoria sol by stirring at 80° C. in water with sufficient nitric acid to provide a total nitrate-to-thorium mole ratio of 0.10.

In more recent work thoria-containing sols have been prepared by alkaline precipitation of a hydrous oxide from a thorium salt, such as thorium nitrate or chloride, and thereafter peptizing the washed precipitate in an electrolyte to form a stable hydrous amorphous thoria sol. While crystalline thoria steam denitrated sols could be prepared with extremely low nitrate content, certain difficulties have been encountered in the preparation of hydrous amorphous thoria-containing sols having low nitrate-to-metal mole ratios. Repeated washing of the hydrous thorium oxide sometimes removed most of the nitrate, depending on the methods used, but in order to peptize to a sol, the solids must be dispersed in an electrolyte, such as nitric acid; unfortunately the amount of nitrate required to peptize the hydrous thorium oxide was too high for the production of good calcined microspheres. This was found to be true, for example, in a process presented by F. W. van der Brugghen et al. at the "Second International Thorium Fuel Cycle Symposium," held at Gatlinburg, Tennessee on May 3–6, 1966. There a thoria-uranium trioxide sol was prepared employing a precipitation-peptization technique. Nitrate-to-metal mole ratios below about 0.25 were not obtained and resulted in the particles shattering explosively upon drying the gel droplets at temperatures of about 130°–150° C. Various methods, such as for example solvent extraction with certain amines, have been investigated to reduce nitrate content and provide a stable low nitrate hydrous amorphous thoria-containing sol. This technique resulted in hydrous amorphous thoria sols having low nitrate-to-metal mole ratio (~0.16) but had certain drawbacks, i.e., required high temperature digestion (~100° C.) with a number of extraction stages and expensive equipment. It is therefore highly desirable to provide a precipitation-peptization process for preparing thoria-uranium trioxide sols which have minimum counterion content and thus provide for formation of high density microspheres without cracking or pitting.

SUMMARY OF THE INVENTION

This object is accomplished by the discovery that a thorium (IV)-uranium (VI) seed sol which is stablized with a stoichiometric excess of counterion could, in a carbon dioxide-free atmosphere, disperse additional quantities of counter-free thorium (IV)-uranium (VI) hydrous oxide as a water slurry under boiling conditions and thereby form a stable thoria-uranium trioxide sol having a minimum counterion content. By the term "counterion" it is meant herein anions of the metal salts which have heretofore been widely employed as starting solutions, such as chlorides, formates, nitrates, etc., and/or mixtures thereof. Also, it will be understood that the term "thorium (IV)-uranium (VI) hydrous oxide" is meant to include thorium (IV)-uranium (VI) hydroxide, the two terms normally being considered substantially equivalent. Any of the well known methods for preparing stable metal oxide sols, such as by autoclaving selected salt solutions, dialysis of salt solutions and/or precipitation-peptization of hydrous oxide precipitate, may be employed in the preparation of the thorium (IV)-uranium (VI) seed sol, provided the resulting thorium (IV)-uranium (VI) sol is stabilized with excess counterion for use as the seed sol. This finding of preparing stable sols from the high side of the counterion advantageously affords, for the first time, the preparation of hydrous amorphous thorium-containing sols which have a theoretical minimum counterion content; thus obviating many of the serious problems encountered in the preparation of these sols for reactor usage. Whereas previous attempts resulted in sols having a nitrate-to-metal mole ratio of about 0.25, a 75 mole percent thoria-25 mole percent uranium trioxide sol having a nitrate-to-metal (thorium plus uranium) mole ratio of 0.13 was prepared by adding to a portion of a water slurry of thorium (IV)-uranium (VI) hydroxide, which had previously been washed free of nitrate, nitric acid to yield a nitrate-to-metal mole ratio of 0.13 computed on a whole-batch basis and thereafter dispersing under boiling conditions and in a carbon dioxide-free atmosphere the remainder, in equal additions of third parts, of the nitrate-free thorium (IV)-uranium (VI) hydrous oxide to form the final thoria-uranium trioxide sol. The resulting sol was readily concentrated by evaporation to provide a total metal concentration of about 1.5 M with a pH range of about 3.9 to 4.3. The thoria-uranium trioxide sol was also amenable to calcination into dense microsphere products from gel droplets without additional washing of the gel droplets to remove nitrate. The product microspheres, which were essentially free of cracks or pits, had a porosity (at 15,000 p.s.i.) of less than one percent and a density of 99 percent of theoretical.

DESCRIPTION OF THE PREFERRED EMBODIMENT

In a first step of the process a thorium (IV)-uranium (VI) seed sol is prepared. As noted hereinbefore the sol may be prepared by any of the well known methods for preparing metal oxide sols. Where the sol is prepared by peptization of a nitrate-free hydrous oxide precipitate, a thorium-uranyl nitrate solution may be added to an alkaline solution, such as ammonium hydroxide. For this process it has been found essential that the mixed nitrate solution be added to the alkaline solution, which is preferably in excess of the stoichiometric amount required for precipitation, rather than the alkaline solution being added to the mixed nitrate solution. Where the latter is performed the hydrous oxide precipitate could not be washed free of the nitrate in a subsequent operation. The thorium-uranyl nitrate solution is preferably 0.5 M in total metal and where employed it may be added to a 3 M ammonium hydroxide solution. While the ratio of thorium to uranium may vary over a wide range, the process is quite suitable, for example, in the preparation of a thoria-uranium trioxide sol having up to ¼ mole fraction uranium. This particular fuel has been proposed for Fort St. Vrain Nuclear Generating Station being built by the Public Service Company of Colorado at Platteville, Colo.

The precipitation is best carried out at an elevated temperature. Temperatures within the range of 75°–85° C. are quite satisfactory. Conducting the precipitation at an elevated temperature facilitates the complete removal of nitrate from the hydrous oxide precipitate in the subsequent washing operation. It is also important in the precipitation operation that the alkaline solution used should not introduce any interfering cations. Aqueous solutions of ammonium hydroxide are preferred due to the ease of removal of the ammonium ion by subsequent boiling. Residual levels of 10–30 p.p.m. were achieved by boiling the thorium (IV)-uranium (VI) hydrous oxide as a water slurry for a period of about 2 hours.

After precipitation the thorium (IV)-uranium (VI) hydrous oxide precipitate is separated from the solution and washed to remove essentially all of the nitrate. In order to prevent the hydrous oxide precipitate from peptizing before the nitrate is removed the washing operation should be effected with dilute ammonium hydroxide solution (about 0.1 M). Again, an elevated temperature should be used in this washing step; a temperature within the range of 75°–85° C. is suitable. Where the precipitation was effected by the addition of the mixed nitrate solution to the alkaline solution, a nitrate-to-metal ratio of 0.003 was achieved, using an ammonium hydroxide wash solution at 80° C. Washing with dilute ammonium hydroxide solution also removes essentially all of the ammonium nitrate present and reduces the ammonium ion/(thorium plus uranium) mole ratio, for example, to about 0.05. The remaining ammonium ion, as ammonia, is readily expelled by boiling the hydrous oxide precipitate as a water slurry. The boiling may be continued until the pH of the evolved steam decreases from its initial value of 9–10 to about 6; this results in a residual ammonium ion level of about 10–30 p.p.m.

As a final step in the preparation of the thoria-uranium trioxide seed sol a quantity of nitrate, which may conveniently be supplied as nitric acid, is added to about one-third of the thorium (IV)-uranium (VI) hydrous oxide water slurry, which is essentially free of nitrate and ammonium ions, and boiled to peptize the solids, forming a clear red sol. The quanity of nitrate is provided so as to produce a stoichiometric excess of nitrate which will be utilized to disperse additional quantities of the remaining nitrate-free hydrous oxide water slurry in a subsequent step. Where, for example, a thoria-uranium trioxide sol having an ultimate nitrate-to-metal mole ratio of 0.13 to 0.14 was desired, nitric acid is added to provide a nitrate-to-metal ratio of about 0.40 in the initial seed sol.

The thoria-uranium trioxide seed sol is then employed to disperse additional quantities of the nitrate-free hydrous oxide water slurry each time forming a new seed sol. This may conveniently be done by adding half of the remaining hydrous oxide water slurry to the thoria-uranium trioxide seed sol with continued boiling until the solids are peptized to form the new seed sol. The nitrate-to-metal ratio of this thoria-uranium trioxide seed sol is about 0.20. The remaining half of the hydrous oxide water slurry is next added to the thoria-uranium trioxide seed sol with continued boiling to peptize the solids and form a thoria-uranium trioxide sol having a nitrate-to-metal ratio of about 0.13.

EXAMPLE

The feasibility of using a seed sol stabilized with excess nitrate to disperse additional nitrate-free thorium (IV)-uranium (VI) hydrous oxide was demonstrated as follows: One liter of a 0.5 M thorium-uranyl nitrate solution with a thorium/uranium mole ratio of 3:1 was prepared by dissolving the nitrates in water. The mixed nitrate solution, in a carbon dioxide-free atmosphere, was added at a rate of 40 ml./min. to one liter of a 3 M ammonium hydroxide solution (ammonia in 70% excess) which was maintained at 75°–80° C. to precipitate thorium (IV)-uranium (VI) hydrous oxide. The fast settling yellow precipitate was filtered by suction and washed with 10 to 12 cake volumes of dilute ammonium hydroxide (0.1 M) to prevent peptization and promote nitrate removal. This required about 2.5 hours for a 0.5 mole batch, using an 18-cm. Buchner funnel. The nitrate-to-metal (thorium plus uranium) mole ratio in the filter cake was reduced to about 0.003 and the ammonium ion-to-metal mole ratio to 0.05.

After washing the thorium (IV)-uranium (VI) hydrous oxide precipitate essentially free of nitrate, the precipitate was formed into a water slurry by adding water to about 3 liters total volume. The water slurry was then heated to boiling to expel the remaining ammonium ions. This phase was continued for about 2.5 hours (with periodic water addition to maintain the volume) and was terminated when the pH of the evolved steam decreased from its initial value of 9–10 to about 6, leaving a residual ammonium ion content of 10–30 p.p.m. A sample of the hydrous oxide was taken, and the crystallite size was determined by X-ray line broadening to be less than 30 angstroms.

About 1 liter of the water slurry was boiled for a few minutes with 65 mls. of 1 M nitric acid, forming a clear red sol. The quantity of nitric acid added was calculated to yield a nitrate-to-metal ratio of 0.13 to 0.14, which appeared to be quite close to the minimum nitrate-to-metal mole ratio necessary for forming a stable thorium-uranium sol, i.e., one in which no solid will settle out upon standing, computed on a whole-batch basis and provided a nitrate-to-metal ratio of about 0.40 in the formed sol. The thoria-uranium trioxide sol having an excess nitrate content was employed as a seed sol to disperse the remainder of the nitrate-free water slurry by adding half of it (1 liter) with continued boiling for about 20 minutes to the seed sol to peptize the solids and form a sol and thereafter adding the remainder of the nitrate-free water slurry to the boiling sol under reflux for about 8 hours to peptize the remaining solids. The nitrate-tometal mole ratio after the first addition to the seed sol was about 0.20 and the nitrate-to-metal ratio after the final addition was about 0.13. A sample of the final low nitrate thoria-uranium trioxide sol was taken and the crystallite size determined by X-ray line broadening to be about 44 angstroms, showing that the amorphous masses of crystallites had grown from their original size of <30 angstroms at precipitation. Electron micrographs showed that the previously flocculated crystallites had dispersed.

The thoria-uranium trioxide sol was concentrated by evaporation of 1.4 M. The concentrated sol was introduced dropwise into a sphere-forming column concurrently with an organic drying agent (2-ethyl-hexanol containing 1.1 percent water, 0.3 percent Span 80, trademark with the Atlas Powder Company for a fatty acid partial ester of hexitol anhydrides, and 0.5 percent Ethomeen S–15, trade-mark with Armour Chemical Division, Armour & Company, for a family of tertiary aliphatic amines possessing one or two alkyl groups ranging from $C_8$–$C_{18}$ in chain length). The sol droplets which formed were suspended in the column by the upward flow of the drying agent, and the droplets were dehydrated to gel microspheres during a 10-minute residence time in the column. The gel microspheres were then removed from the bottom of the column, air dried at 140° C. and fired in air using a temperature rise rate of 20° C./hour through 300° C. and 30° C./hour to 600° C., then 300° C./hour to 1200° C. The final firing temperature was maintained for 4 hours in air and then 4 hours in argon—4% hydrogen to reduce the uranium oxides to $UO_2$. A sample of the product microspheres was taken and analyzed, having the following properties: density (at 15,000 p.s.i.)—99.5 percent of theoretical, porosity—less than one percent, and average crush strength (for 250μ fraction)—1700 g./microsphere. Unlike microspheres previously prepared from high nitrate sols the fired microspheres were perfect spheres, having essentially no pits or cracks therein.

Numerous attempts were made to disperse the thorium (IV)-uranium (VI) hydrous oxide by boiling directly with minimum counterion concentration (nitrate-to-metal mole ratio of 0.13 to 0.14) but in all cases no sol dispersal resulted. The suspension of yellow hydrous oxide remained unchanged, even with boiling for many hours, indicating that the reaction threshold leading to peptization had not been reached. In all cases peptization occurred only when approached from the high side of counterion concentration.

What is claimed is:

1. A process for preparing a thoria-uranium trioxide sol in a carbon dioxide-free atmosphere, said sol having a minimum counterion, comprising the steps of:
   (a) forming a thorium (IV)-uranium (VI) seed sol, said sol stabilized with a stoichiometric excess of counterion; and
   (b) thereafter dispersing additional quantities of counterion-free thorium (IV)-uranium (VI) hydrous oxide as a water slurry in said seed sol with boiling, thereby peptizing the solids into said minimum counterion sol.

2. The method of claim 1 wherein said thorium (IV)-uranium (VI) seed sol has a counterion-to-metal mole ratio of about 0.4.

3. The method of claim 1 wherein said thorium (IV)-uranium (VI) seed sol is prepared by
   (a) Coprecipitating a thorium (IV)-uranium (VI) hydrous oxide precipitate by adding a solution consisting of thorium and uranyl nitrate to an excess ammonium hydroxide solution;
   (b) washing the resulting hydrous oxide precipitate with dilute aqueous ammonia solution until the precipitate is substantially nitrate-free;
   (c) forming a thorium (IV)-uranium (VI) water slurry from said nitrate-free hydrous oxide precipitate;
   (d) removing ammonium ions from the solids; and
   (e) adding excess nitrate to a portion of said water slurry while boiling to peptize and form said seed sol.

4. The method of claim 3 wherein said thorium and uranyl nitrate solution comprises 0.5 M in total metal and said ammonium hydroxide solution is 3 M.

5. The method of claim 3 wherein said coprecipitation is conducted at a temperature within the range of 75°–85° C.

6. The method of claim 3 wherein said nitrate-free thorium (IV)-uranium (VI) water slurry has a nitrate-to-metal ratio of about 0.003.

7. The method of claim 3 wherein said ammonium ions are removed by boiling until the content is reduced to 10–30 p.p.m.

8. The method of claim 3 wherein said thoria-uranium trioxide sol has a nitrate-to-metal ratio of about 0.13.

9. The method of claim 3 wherein said thoria-uranium trioxide sol has a pH of about 3.9 to 4.3.

References Cited

UNITED STATES PATENTS

| | | | |
|---|---|---|---|
| 3,035,895 | 5/1962 | McCorkle et al. | 252—301.1 X |
| 3,091,592 | 5/1963 | Fitch et al. | 252—301.1 |
| 3,151,085 | 9/1964 | Smith et al. | 252—301.1 |
| 3,326,813 | 6/1967 | Fitch et al. | 252—301.1 |
| 3,370,016 | 2/1968 | Briggs | 252—301.1 |
| 3,409,557 | 11/1968 | Fitch et al. | 252—301.1 |

CARL D. QUARFORTH, Primary Examiner

F. M. GITTES, Assistant Examiner

U.S. Cl. X.R.

23—345, 354, 355